United States Patent
Kuzuyama

(10) Patent No.: US 7,874,280 B2
(45) Date of Patent: Jan. 25, 2011

(54) HOMOGENEOUS CHARGE COMPRESSION IGNITION ENGINE

(75) Inventor: Hiroshi Kuzuyama, Kariya (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 49 days.

(21) Appl. No.: 12/513,113

(22) PCT Filed: Nov. 13, 2007

(86) PCT No.: PCT/JP2007/072337

§ 371 (c)(1), (2), (4) Date: Apr. 30, 2009

(87) PCT Pub. No.: WO2008/059981

PCT Pub. Date: May 22, 2008

(65) Prior Publication Data

US 2010/0024766 A1  Feb. 4, 2010

(30) Foreign Application Priority Data

Nov. 14, 2006 (JP) .............................. 2006-307818

(51) Int. Cl.
*F02B 17/00* (2006.01)
(52) U.S. Cl. ...................................... 123/430; 123/295
(58) Field of Classification Search .................. 123/295, 123/430, DIG. 4
See application file for complete search history.

(56) References Cited

U.S. PATENT DOCUMENTS 6,237,562 B1   5/2001   Awasaka et al.
6,267,097 B1   7/2001   Urushihara et al.
6,336,436 B1   1/2002   Miyakubo et al.
6,644,019 B2 * 11/2003  Morikawa et al. ............. 60/285

(Continued)

FOREIGN PATENT DOCUMENTS

DE     102004034505 A1   2/2006

(Continued)

OTHER PUBLICATIONS

International Search Report issued on Feb. 27, 2008, for International Application No. PCT/JP2007/072337.

(Continued)

*Primary Examiner*—Erick Solis
(74) *Attorney, Agent, or Firm*—Locke Lord Bissell & Liddell LLP

(57) ABSTRACT

An HCCI engine provides a negative overlap period in an operation during HCCI combustion. During the negative overlap period, an intake valve and an exhaust valve are both closed when a piston is in the vicinity of the top dead center in an exhaust stroke, so that burned gas remains inside a combustion chamber. The engine is provided with a throttle, a fuel valve and an ECU. The ECU controls the throttle during a switching period in which SI combustion is switched to the HCCI combustion so that the opening degree of the throttle increases to the opening degree at the time of steady HCCI operation from the opening degree at the time of steady SI operation, and at the same time, controls the fuel valve such that the amount of fuel supplied to the intake passage becomes greater than the amount at the time of the steady SI operation.

13 Claims, 5 Drawing Sheets

U.S. PATENT DOCUMENTS

| | | |
|---|---|---|
| 6,668,790 B2 * | 12/2003 | Chmela et al. ............... 123/295 |
| 6,978,771 B2 | 12/2005 | Kuzuyama et al. |
| 7,748,355 B2 * | 7/2010 | Megli et al. ............... 123/90.15 |
| 2002/0007816 A1 | 1/2002 | Zur Loye et al. |
| 2003/0061803 A1 | 4/2003 | Iihoshi et al. |
| 2007/0144480 A1 | 6/2007 | Herweg et al. |
| 2008/0066713 A1 * | 3/2008 | Megli et al. ................. 123/295 |
| 2008/0178836 A1 * | 7/2008 | Yamashita et al. .......... 123/295 |

FOREIGN PATENT DOCUMENTS

| | | |
|---|---|---|
| EP | 1085192 A2 | 3/2001 |
| EP | 1298292 A2 | 4/2003 |
| JP | 2000-220458 A | 8/2000 |
| JP | 2001-090540 A | 4/2001 |
| JP | 2003-343313 A | 12/2003 |
| JP | 2004-076607 A | 3/2004 |
| JP | 2004-293471 A | 10/2004 |
| JP | 2006-022664 A | 1/2006 |

OTHER PUBLICATIONS

Office Action for Japanese Application No. 2006-307818, dated Sep. 7, 2010.

* cited by examiner

US 7,874,280 B2

HOMOGENEOUS CHARGE COMPRESSION IGNITION ENGINE

TECHNICAL FIELD

The present invention relates to a homogeneous charge compression ignition engine where the combustion mode can be switched between spark ignition combustion and homogeneous charge compression ignition combustion.

BACKGROUND ART

In recent years, homogeneous charge compression ignition (HCCI) engines from which excellent fuel economy and thermal efficiency can be gained have been drawing attention, and various researches have been conducted on such engines. In most HCCI engines, air-fuel mixture is created through mixture of fuel and air in an intake passage of the engine so that the air-fuel mixture can be supplied to a combustion chamber. Then, the temperature increases and the pressure rises in the air-fuel mixture contained inside the combustion chamber as the piston rises at the time of the compression stroke, so that the mixture spontaneously ignites. One obstacle that needs to be overcome in terms of putting HCCI engines into practice is that the engine operating range, which allows homogeneous charge compression ignition (HCCI) combustion to be stably controlled, is still narrow. In order to overcome the obstacle, there is a trend to implement HCCI combustion in stationary engines where the ordinarily used operating range is relatively narrow, for example, gas engines for GHPs (gas heat pumps). In addition, an engine where the combustion mode is switched so that HCCI combustion is carried out in the frequently-used middle rotation and middle load range, and spark ignition (SI) combustion is carried out in the low rotation range and the high rotation range, as well as in the low load range and the high load range, have also been proposed. Japanese Laid-Open Patent Publication No. 2000-220458 and Japanese Laid-Open Patent Publication No. 2004-293471, for example, disclose a method for controlling an HCCI engine where the combustion mode can be switched between the SI combustion and the HCCI combustion.

In Japanese Laid-Open Patent Publication No. 2000-220458, the throttle is gradually opened when the SI combustion is switched to the HCCI combustion, so that the amount of intake is higher at the time of the HCCI combustion than at the time of SI combustion. As a result, the air-fuel ratio at the time of HCCI combustion is higher than at the time of the SI combustion, so that the air-fuel mixture becomes lean at the time of operation through HCCI combustion, and the fuel economy and the thermal efficiency increase.

In addition, in Japanese Laid-Open Patent Publication No. 2004-293471, the throttle opening degree is temporarily fixed at a level between the opening degree at the time of the SI combustion and the opening degree at the time of HCCI combustion when SI combustion is switched to the HCCI combustion. As a result, pumping loss is reduced while the drivability is maintained, so that the fuel economy increases.

The throttle opening degree has a closing angle in the state of the SI combustion before the combustion mode is switched to HCCI combustion. Accordingly, there is a difference in pressure between portions on either side of the throttle within the intake passage. Specifically, negative pressure (intake negative pressure) reaches the portion of the intake passage on the side corresponding to the combustion chamber of the throttle, and substantially atmospheric pressure reaches the portion of the intake passage on the side opposite to the combustion chamber. When the throttle opens in the configuration described in the above Japanese Laid-Open Patent Publication No. 2000-220458 and Japanese Laid-Open Patent Publication No. 2004-293471, the flow rate of air in the vicinity of the throttle suddenly increases due to the difference in pressure. Accordingly, in the case where the fuel supplying section is located in the vicinity of the throttle, the air-fuel mixture becomes excessively lean. As a result, the engine misfires during the period in which the SI combustion is switched to HCCI combustion, and the engine may stall. In particular, in the case where a mixer or a carburetor is used to supply the air-fuel mixture, fuel is supplied at a point upstream from the throttle and in the vicinity of the throttle, and therefore, the air-fuel ratio (excess air ratio) in the air-fuel mixture is greatly affected by the opening and closing of the throttle.

The air-fuel mixture becoming lean is not a significant problem in the case where the excess air ratio in the air-fuel mixture required for HCCI combustion is high. However, in the case where HCCI combustion is carried out in an HCCI engine which provides a negative overlap period at the time of HCCI combustion and uses an internal EGR, it is necessary to supply a relatively rich air-fuel mixture into the combustion chamber. That is, it is necessary to adjust the air-fuel ratio so that the excess air ratio becomes low. In this case, lean air-fuel mixture as described above causes a significant problem. The negative overlap period is a period during which both the exhaust valve and the intake valve are closed when the piston is located in the vicinity of the top dead center in the exhaust stroke. In particular, in order to achieve high fuel economy and low amount of NOx emission, lean combustion is in some cases carried out at the time of the SI combustion. In this case, the excess air ratio sometimes becomes greater than that at the time of HCCI combustion, and thus, the above described problem becomes more conspicuous.

Thus, the amount of intake increases most suddenly when the throttle starts opening. Therefore, even when the amount of intake is adjusted using the technology disclosed in the above Japanese Laid-Open Patent Publication No. 2000-220458 and Japanese Laid-Open Patent Publication No. 2004-293471, it is difficult to suppress such a sudden increase in the amount of intake and prevent the air-fuel mixture from becoming excessively lean as a result.

DISCLOSURE OF THE INVENTION

Accordingly, it is an objective of the present invention to provide an HCCI engine which, when the combustion mode is switched from the SI combustion to the HCCI combustion, prevents the air-fuel mixture from becoming excessively lean when the throttle opens, thereby preventing misfiring.

In order to achieve the above described objective, an aspect of the present invention provides a homogeneous charge compression ignition engine having a combustion chamber and an intake passage which is connected to this combustion chamber. In this engine, the combustion mode is switched between spark ignition combustion and homogeneous charge compression ignition combustion through a switching period. The engine provides a negative overlap period in the operation during homogeneous charge compression ignition combustion. This negative overlap period is a period during which an intake valve and an exhaust valve are both closed when a piston is in the vicinity of the top dead center in the exhaust stroke, so that burned gas remains inside the combustion chamber. The engine is provided with a throttle, an adjusting section and a control section. The throttle adjusts the amount of air supplied to the combustion chamber. The adjusting section adjusts the amount of fuel supplied to the intake passage. The control section controls the throttle and the adjusting section. During the switching period, in which the spark ignition combustion is switched to the homogeneous charge compression ignition combustion, the control section controls the throttle such that the throttle opening degree increases from the opening degree at the time of steady operation at the spark ignition combustion to the opening degree at the time of the steady operation at the homogeneous charge compression ignition combustion. Furthermore, the control section controls the adjusting section such that the amount of fuel supplied to the intake passage becomes greater than at the time of the steady operation at the spark ignition combustion.

BEST MODE FOR CARRYING OUT THE INVENTION

Figure 1:
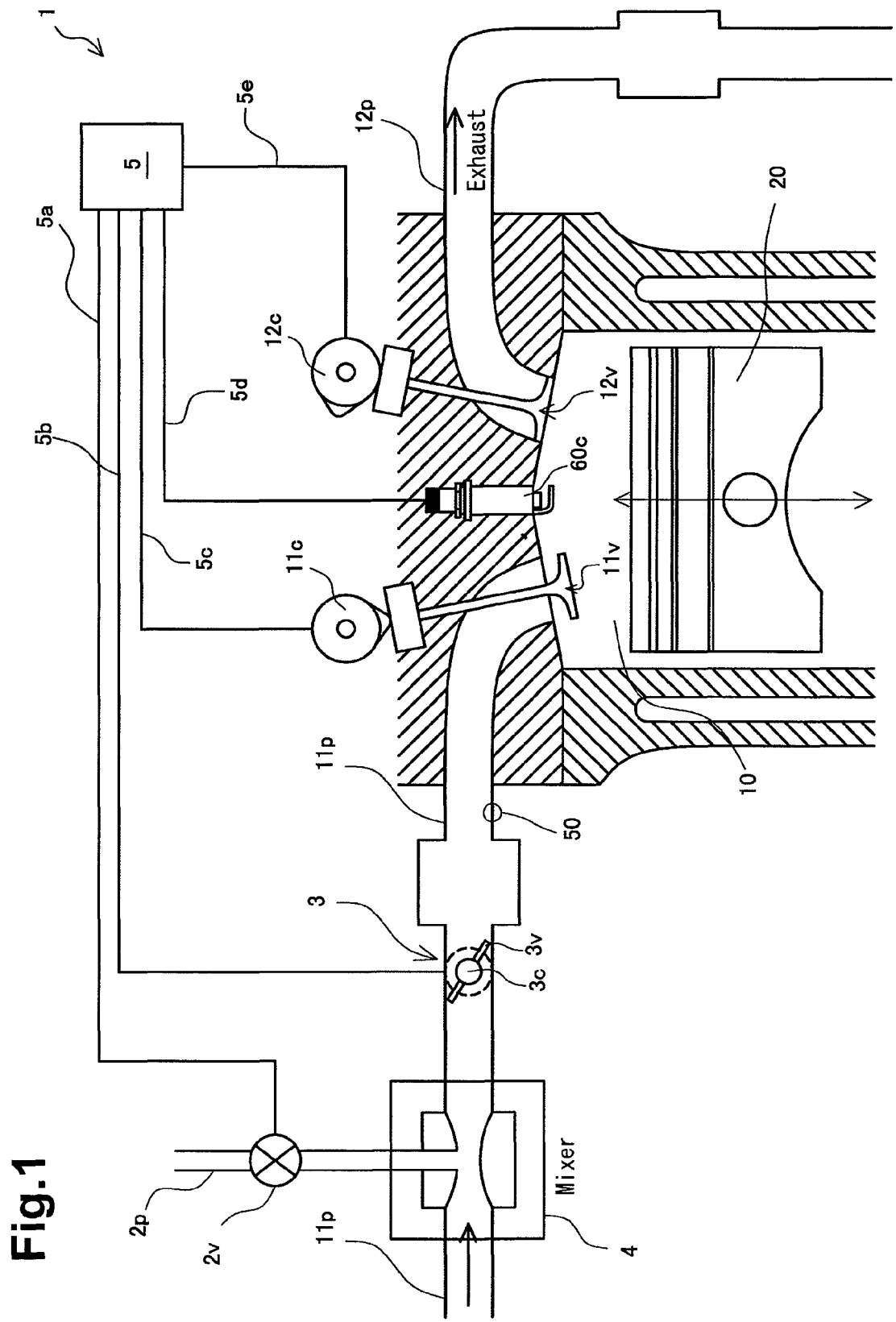
FIG. 1 is a schematic diagram showing the entire configuration of an HCCI engine according to a first embodiment of the present invention.

In the following, preferred embodiments of the present invention are described in reference to the drawings.

In reference to FIG. 1, the entire configuration of a homogeneous charge compression ignition engine (HCCI engine) 1 according to a first embodiment of the present invention will be described.

The engine 1 has a combustion chamber 10, an intake passage 11p which is connected to the combustion chamber 10, an intake valve 11v, an exhaust valve 12v, and an exhaust passage 12p. The engine 1 operates while appropriately switching the combustion mode between spark ignition combustion (SI combustion) and homogeneous charge compression ignition combustion (HCCI combustion) in accordance with the operating condition (load and number of rotations of the engine). Accordingly, the engine 1 achieves both high fuel economy due to the HCCI combustion and high output due to the SI combustion. The intake passage 11p is provided with a mixer 4. A gas fuel is supplied to this mixer 4 through a fuel supplying path 2p so that air and the fuel are mixed in the mixer 4. The fuel supplying path 2p, which is connected to the mixer 4 (intake passage 11p), functions as a path for a gas fuel. Although in the present embodiment, a gas fuel, such as city gas or LPG, is used as the fuel, the fuel is not limited to a gas fuel. In addition, although in the present embodiment, the fuel and air are mixed in the mixer 4, they may be mixed in an apparatus other than the mixer 4 (for example a carburetor or an injector).

In addition, the engine 1 is controlled so as to provide a negative overlap period in the operation during HCCI combustion. The engine 1 can carry out HCCI combustion during the negative overlap period using the internal EGR. The negative overlap period is a period during which the exhaust valve and the intake valve are both closed when the piston 20 is located in the vicinity of the top dead center in the exhaust stroke. In this case, the exhaust valve is closed before the piston 20 reaches the top dead center in the exhaust stroke. As a result, part of the burned gas remains inside the combustion chamber as an internal EGR gas, and is used for the next combustion. The above described configuration allows the high temperature internal EGR gas to be mixed with a new air-fuel mixture supplied into the combustion chamber 10, so that the temperature inside the combustion chamber 10 increases. As a result, the ignitability increases during HCCI combustion. It thus becomes possible to control the time of ignition to a certain degree by adjusting the length of the negative overlap period. The internal EGR is used as described above, and therefore, it is necessary to supply a relatively rich air-fuel mixture to the combustion chamber 10 at the time of HCCI combustion. This is because the inside of the combustion chamber 10 is adjusted to the air-fuel ratio required at the time of HCCI combustion when the internal EGR gas and the air-fuel mixture are mixed.

In addition, the engine 1 has a throttle 3 and a fuel valve 2v, which is an adjusting section. Furthermore, the engine 1 has an ECU (electronic control unit) 5, which is a control section, and the fuel valve 2v, the throttle 3, the intake valve 11v, an ignition plug 60c and the exhaust valve 12v are electrically connected to the ECU 5 through wires 5a to 5e, respectively. Thus, the ECU 5 controls the operation of the fuel valve 2v, the throttle 3, the intake valve 11v, the ignition plug 60c and the exhaust valve 12v. In further detail, the intake valve 11v and the exhaust valve 12v have cams 11c and 12c, respectively, and the ECU 5 controls the operation of the cams 11c and 12c, so that the opening and closing operation of the intake valve 11v and the exhaust valve 12v is controlled. In addition, the ignition plug 60c is used at the time of the SI combustion.

As shown in FIG. 1, the throttle 3 has a shaft 3c, a valve portion 3v, and a step motor (not shown) for driving the shaft 3c. The valve portion 3v is rotatable around the shaft 3c. In addition, the opening degree of the valve portion 3v is adjusted through controlling of the step motor by the ECU 5, and therefore, the amount of intake of air which is thus supplied to the combustion chamber 10 through the intake passage 11p is adjusted.

The fuel valve 2v is provided in the fuel supplying path 2p. The opening degree of the fuel valve 2v is controlled by the ECU 5. As a result, the amount of fuel supplied to the intake passage 11p is adjusted.

Figure 2:
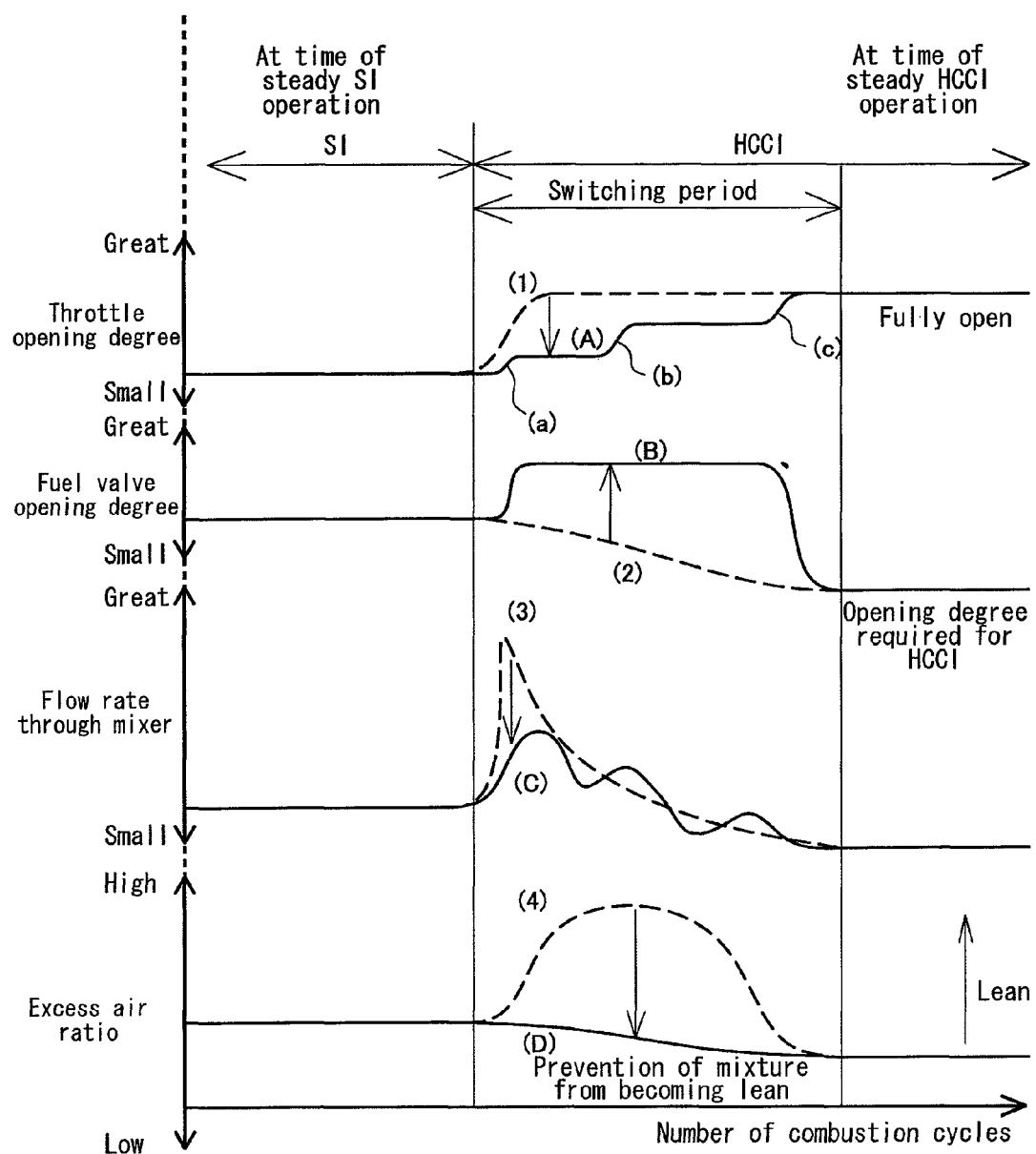
FIG. 2 is a chart showing the throttle opening degree, the fuel valve opening degree, the flow rate through the mixer, and the excess air ratio in the engine of FIG. 1.

Next, the operation of the engine 1 is described in reference to FIG. 2. FIG. 2 is a chart showing the throttle opening degree, the fuel valve opening degree, the flow rate through the mixer, and the excess air ratio in the engine 1. The lateral axis in FIG. 2 indicates the number of combustion cycles. The throttle opening degree and the fuel valve opening degree indicate the state after control by the ECU 5, and the flow rate through the mixer and the excess air ratio indicate the results gained through this control. In addition, in FIG. 2, HCCI combustion is carried out using the internal EGR. Accordingly, the throttle opening degree, the fuel valve opening degree, the flow rate through the mixer and the excess air ratio when the engine 1 steadily operates during the HCCI combustion, that is, at the time of steady HCCI operation, are amounts or values in the case where internal EGR is carried out.

Figure 3:
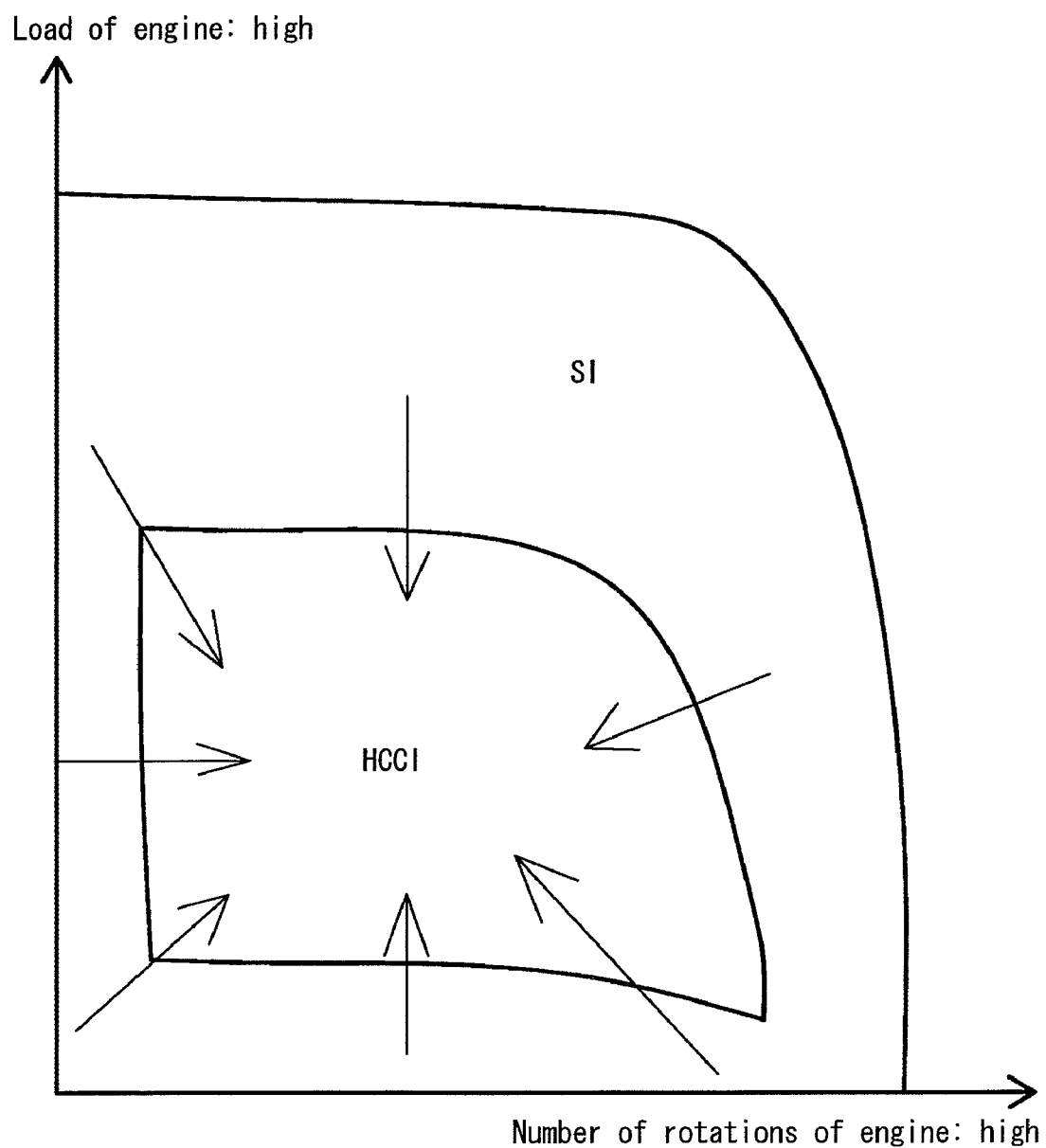
FIG. 3 is a schematic diagram showing one example of the operation range of SI and HCCI in the engine of FIG. 1.

In the engine 1 according to the present invention, as shown in FIG. 3, the combustion mode is switched between the HCCI combustion and the SI combustion in accordance with the load of the engine and the number of rotations of the engine. Accordingly, "switch from the SI combustion to the HCCI combustion" includes various switching patterns, as shown by the arrows in FIG. 3. The chart of FIG. 2 is one example from among various switching patterns, and the present embodiment is not limited to the pattern shown in FIG. 2.

In addition, the ECU 5 in the HCCI engine 1 according to the present embodiment has a control pattern as that shown in the chart of FIG. 2 at the time of switching, and in addition to this pattern shown in FIG. 2, has various control patterns corresponding to various switching patterns (from SI to HCCI), as in FIG. 3.

"Throttle opening degree" in FIG. 2 indicates the opening degree of the throttle 3. As shown in FIG. 2, the throttle opening degree is such that the throttle is fully open at the time of the steady HCCI operation. In addition, "fuel valve opening degree" indicates the opening degree of the fuel valve 2v.

In addition, in FIG. 2, "flow rate through the mixer" indicates the flow rate of the air-fuel mixture which passes through the mixer 4. In addition, in FIG. 2, "excess air ratio" is a value gained by dividing the air-fuel ratio in the air-fuel mixture supplied to the combustion chamber 10 through the intake passage 11p by the stoichiometric air-fuel ratio. The air-fuel ratio that is used for obtaining the excess air ratio is measured by the sensor 50 provided between the throttle 3 and the combustion chamber 10 in FIG. 1. The higher the excess air ratio is, the leaner the air-fuel mixture becomes.

The solid lines in FIG. 2 show the state in the case of the control according to the present embodiment. According to the present embodiment, the throttle opening degree increases step by step during the period in which the combustion mode is switched from the SI combustion to the HCCI combustion, and the fuel valve opening degree once increases, and after that, is changed to the opening degree required for the HCCI combustion. The dotted lines show the state in the case where the throttle opening degree increases directly to a fully open state during the period in which the combustion mode is switched from the SI combustion to the HCCI combustion, and the fuel valve opening degree changes directly to the opening degree required for the HCCI combustion.

As described above, there is a difference in pressure between portions of the intake passage 11p on either side of the throttle 3. Specifically, negative pressure (intake negative pressure) reaches the portion of the intake passage 11p on a side corresponding to the combustion chamber 10 of the throttle 3, and substantially atmospheric pressure reaches the portion of the intake passage 11p on the side opposite to the combustion chamber 10. In the example shown by the dotted lines, the throttle opening degree increases directly to the opening degree at the time of the steady HCCI operation (in a fully open state) from the opening degree at the time of steady operation of the engine 1 during the SI combustion (at the time of steady SI operation) (see (1)), and the fuel valve opening degree decreases directly to the opening degree required during HCCI combustion (opening degree at the time of the steady HCCI operation) (see (2)). In this case, the above described difference in pressure causes the flow rate through the mixer to suddenly increase (see (3)), and the excess air ratio suddenly increases during the switching period (see (4)). As a result, the air-fuel mixture becomes excessively lean, and thus, it becomes easy for the engine to misfire and stall.

The internal EGR is carried out in the engine 1 at the time of compression ignition operation as described above, and therefore, it is necessary to supply a relatively rich air-fuel mixture to the combustion chamber 10. Accordingly, in the case where the air-fuel mixture becomes lean (see (4)), such problems as misfiring become significant. Specifically, there are some cases where lean combustion is carried out during the SI combustion, in order to achieve high fuel economy and a low amount of NOx emission. In this case, the excess air ratio sometimes becomes greater than that at the time of the HCCI combustion, and the above described problems become more significant.

Meanwhile, in the engine 1 according to the present invention, the ECU 5 controls the throttle 3 during the period in which the SI combustion is switched to the HCCI combustion so that the opening degree of the throttle 3 increases to the opening degree at the time of the steady HCCI operation from the opening degree at the time of the steady SI operation (see (A)). In addition, the ECU 5 controls the fuel valve 2v during this switching period such that the amount of fuel supplied to the intake passage 11p becomes greater than the amount of fuel supplied at the time of the steady SI operation (see (B)). As a result, the flow rate through the mixer is prevented from suddenly increasing (see (C)) and the excess air ratio at the time of the SI combustion gently changes to the excess air ratio at the time of the HCCI combustion, without any sudden increase in the excess air ratio during the switching period (see (D)). Therefore, the air-fuel mixture can be prevented from becoming excessively lean.

In addition, the opening degree of the throttle 3 is controlled by the ECU 5 during the switching period so as to increase step by step to the opening degree at the time of the steady HCCI operation (see (A)). The ECU 5 increases the opening degree of the throttle 3 in at least one step from the second step onward by an incremental amount which is greater than the incremental amount in the first step. In FIG. 2, the incremental amount is greater in the second step (see (b)) and in the third step (see (c)) than in the first step (see (a)).

A peak flow rate occurs in several steps in the flow rate through the mixer as the throttle 3 is controlled step by step. Each time that a peak flow rate occurs corresponds to the time immediately after the throttle 3 opens (see (C)). In addition, it is not necessary for the opening degree of the throttle 3 to be controlled step by step. The throttle opening degree may, for example, increase monotonously to the opening degree at the time of the HCCI combustion from the opening degree at the time of the SI combustion. In this case, the incremental amount in the opening degree for the number of combustion cycles (that is, the incremental ratio of the opening) may be smaller.

In addition, the ECU 5 controls the fuel valve 2v such that the amount of fuel supplied to the intake passage 11p becomes greater than the amount of fuel supplied at the time of the steady SI operation before the opening degree of the throttle 3 becomes the opening degree at the time of the steady HCCI operation. In addition, the ECU 5 controls the fuel valve 2v in such a manner that the amount of fuel supplied to the intake passage 11p becomes the amount of fuel supplied at the time of the steady HCCI operation after the opening degree of the throttle 3 becomes the opening degree at the time of the steady HCCI operation (see (A) and (B)). The amount of fuel supplied increases only during the switching period in which the air-fuel mixture becomes excessively lean as described above, and therefore, the combustion mode is smoothly switched from the SI combustion to the HCCI combustion while the air-fuel mixture is prevented from temporarily becoming lean.

In this configuration, the air-fuel mixture is prevented from becoming excessively lean when the amount of intake suddenly increases. Therefore, the engine 1 is prevented from misfiring. In addition, occurrence of steps in the torque, increase in HC and CO, and lowering of the fuel economy due to increase in HC and CO are prevented.

In addition, during the switching period, the opening degree of the throttle 3 increases step by step to the opening degree at the time of the steady HCCI operation, and therefore, the amount of intake is prevented from suddenly increasing, and the air-fuel mixture is prevented from becoming excessively lean.

In addition, at least one of the incremental amounts of the opening degree of the throttle 3 during the switching period in the second step onward is greater than the incremental amount in the first step. Accordingly, when the throttle 3 slightly opens, specifically during the period in which the throttle 3 starts opening (first step), the amount of intake is prevented from suddenly increasing without fail, and the air-fuel mixture can be prevented from becoming excessively lean. The present embodiment is not limited to this control.

In addition, the higher the load of the engine becomes at the time of the SI combustion, the greater the throttle opening degree becomes. In this case, it is desirable for the number of steps in the discrete control of the throttle opening degree during the switching period to be reduced so that the amount of change in the opening per step increases. In addition, it is desirable for the incremental amount of the fuel valve opening degree to decrease as the load of operation becomes higher.

Figure 4:
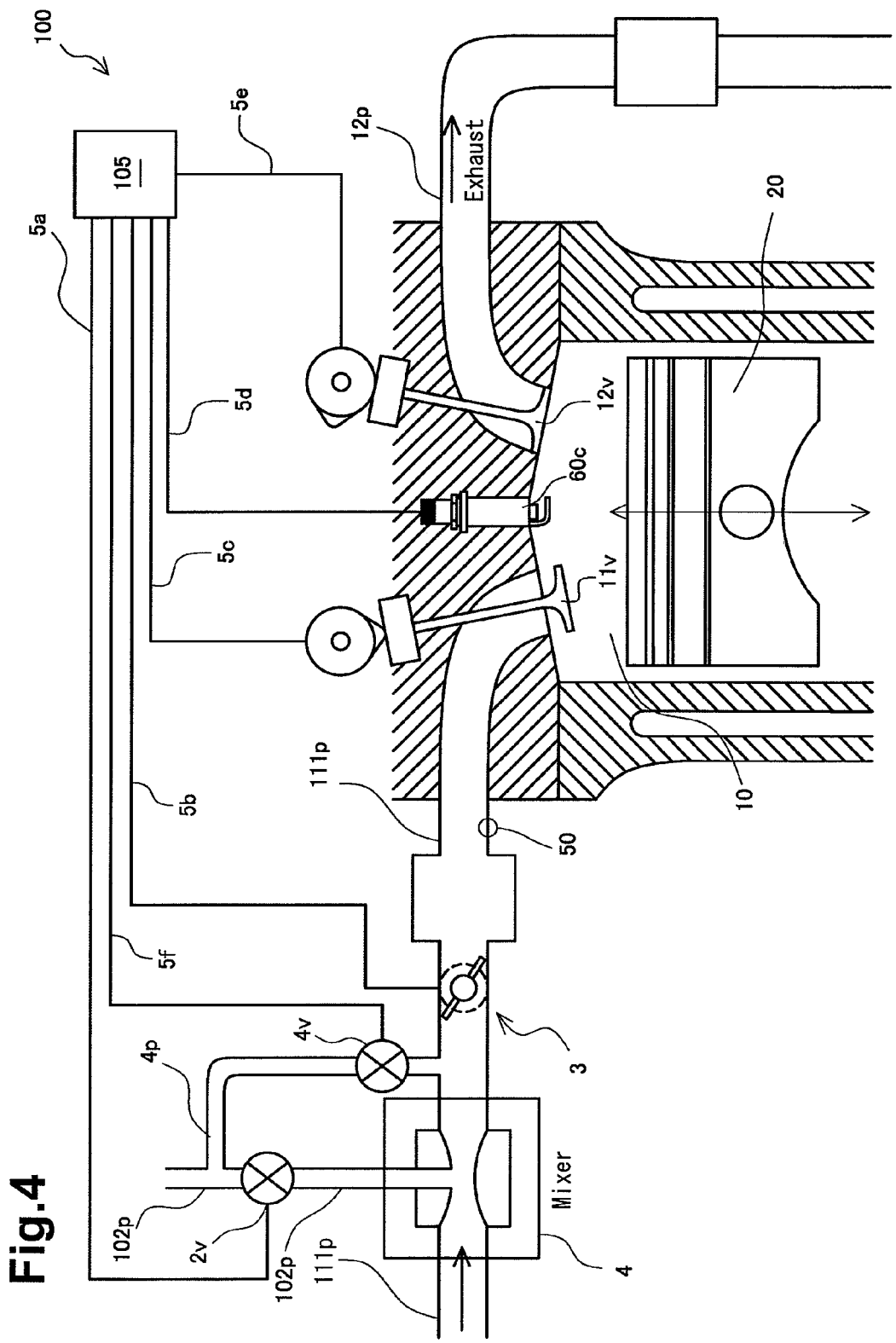
FIG. 4 is a schematic diagram showing the entire configuration of an HCCI engine according to a second embodiment of the present invention.
Figure 5:
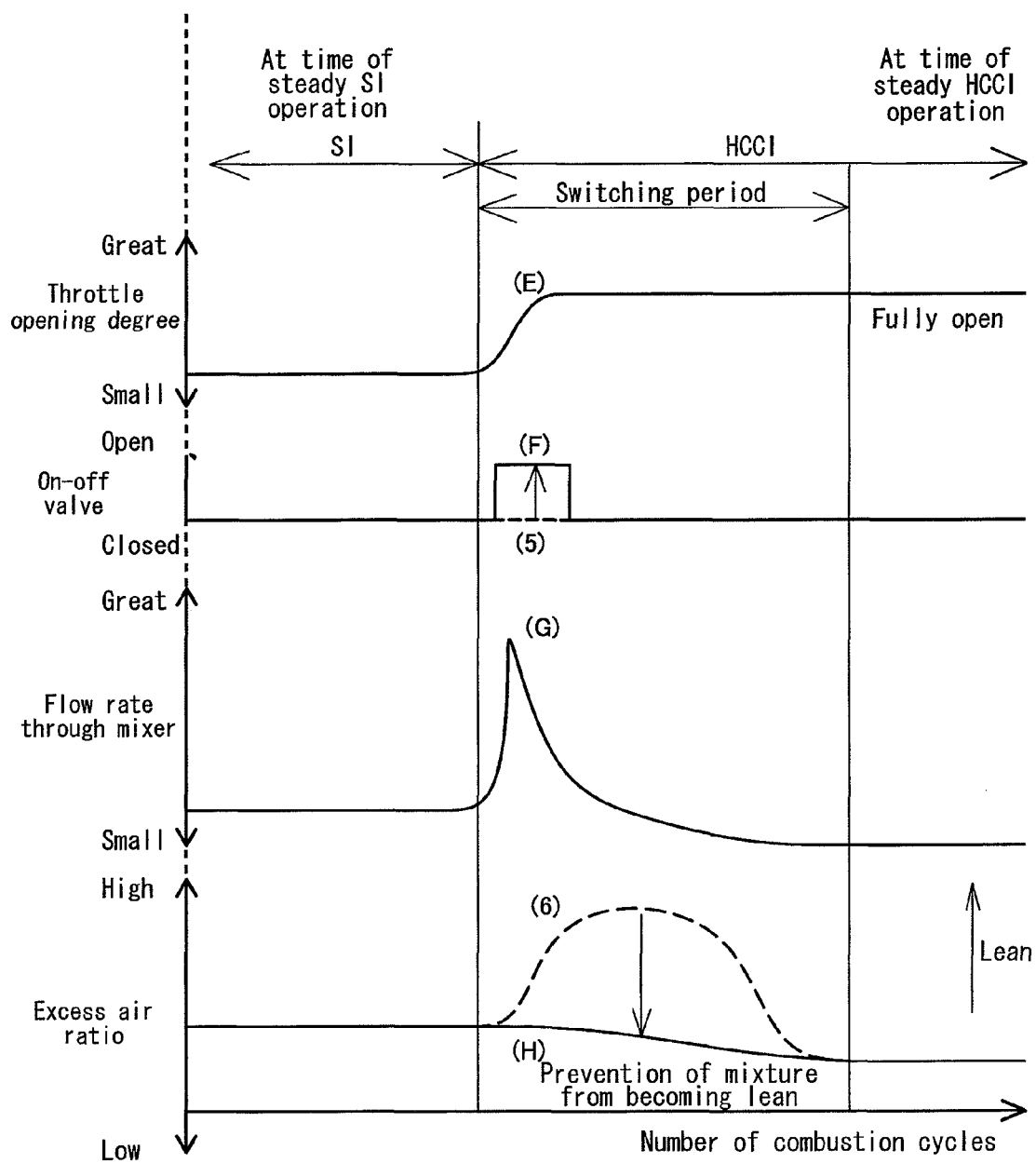
FIG. 5 is a chart showing the throttle opening degree, the fuel valve opening degree, the flow rate through the mixer, and the excess air ratio in the engine of FIG. 4.

Next, an HCCI engine 100 according to a second embodiment of the present invention is described in reference to FIGS. 4 and 5. In the following, parts which are different from those in the first embodiment are mainly described. The same symbols are attached to parts which are similar to those in the first embodiment, and the descriptions thereof are omitted.

A gas fuel is used in the engine 100. In addition, as shown in FIG. 4, a mixer 4 is provided in the intake passage 111*p* so that air and fuel are mixed in the mixer 4. In addition, a first fuel supplying path 102*p* is connected to the mixer 4. The first fuel supplying path 102*p* corresponds to the fuel supplying path 2*p* in the first embodiment. In addition, a second fuel supplying path 4*p* branches out from a portion of the first fuel supplying path 102*p* that is upstream from the fuel valve 2*v*, and the second fuel supplying path 4*p* is connected to the intake passage 111*p*. That is, the fuel valve 2*v* is provided in a portion of the first fuel supplying path 102*p* between the mixer 4 and the point where the first fuel supplying path 102*p* and the second fuel supplying path 4*p* branch. The second fuel supplying path 4*p* and the first fuel supplying path 102*p* are connected.

In addition, an on-off valve (fuel supply amount adjusting section) 4*v* is provided in the second fuel supplying path 4*p*. In addition, the on-off valve 4*v* is electrically connected to the ECU 105 via a wire 5*f*. In addition, the ECU 105 controls the operation of the fuel valve 2*v*, the throttle 3, the intake valve 11*v*, the ignition plug 60*c*, the exhaust valve 12*v* and the on-off valve 4*v*.

Next, the operation of the engine 100 is described in reference to FIG. 5. In FIG. 5, "on-off valve" is the open/close state of the on-off valve 4*v*. As shown in FIG. 5, the on-off valve 4*v* is in a closed state at the time of the steady SI operation and at the time of the steady HCCI operation. Thus, in the engine 100, a certain amount of fuel is supplied to the intake passage 111*p* separately from the mixer 4 through the opening and closing of the on-off valve 4*v*.

Broken lines in the chart of FIG. 5 show a case where the on-off valve 4*v* does not open or close (in the case where there is no on-off valve 4*v* or in the case where the on-off valve 4*v* is not being controlled).

As described above, there is a difference in pressure between portions on both sides of the throttle 3 in the intake passage 111*p*. Specifically, negative pressure (intake negative pressure) reaches a portion of the intake passage 111*p* on a side corresponding to the combustion chamber 10 of the throttle 3 and substantially atmospheric pressure reaches a portion of the intake passage 111*p* on the side opposite to the combustion chamber 10. In the case where the combustion mode is switched from the SI combustion to the HCCI combustion, the ECU 105 increases the opening degree of the throttle 3 directly to the opening degree at the time of the steady HCCI operation (fully open state) from the opening degree at the time of the steady SI operation (see (E), same as broken line (1) in FIG. 2). In the case where the on-off valve 4*v* is not opened or closed (see (5)), the flow rate through the mixer suddenly increases, due to the above described difference in pressure (see (G), same as (3) in FIG. 2), and the excess air ratio suddenly increases during the switching period (see (6)). As a result, the air-fuel mixture becomes too lean and the engine sometimes misfires or stalls.

According to the second embodiment, in the same manner as in (2) in FIG. 2, the opening degree of the fuel valve 2*v* (fuel valve opening degree) is reduced directly to the opening degree required for the HCCI combustion (opening degree at time of the steady HCCI operation).

Meanwhile, the solid lines in the chart of FIG. 5 show a case where the on-off valve 4*v* is opened and closed. In this case, the ECU 105 controls the on-off valve 4*v* to an open state (see (F)), while the flow rate through the mixer during the switching period suddenly becomes higher in comparison with the flow rate through the mixer at the time of the steady SI operation (see (G)). As a result, the excess air ratio at the time of the SI combustion gradually changes to the excess air ratio at the time of the HCCI combustion (see (H)), without any sudden increase in the excess air ratio during the switching period. As a result, the air-fuel mixture can be prevented from becoming excessively lean.

As described above, a constant amount of fuel is supplied to the intake passage 111*p* separately from the mixer 4 in the engine 100 using a gas fuel. Accordingly, the engine 100 provides a simple configuration where the air-fuel mixture can be prevented from becoming excessively lean.

In addition, the ECU 105 controls the on-off valve 4*v* before the opening degree of the throttle 3 becomes the opening degree at the time of the steady HCCI operation so that the amount of fuel supplied to the intake passage 111*p* becomes greater than the amount of fuel supplied at the time of the steady SI operation (that is, the valve becomes of an open state). In addition, the ECU 105 controls the on-off valve 4*v* after the opening degree of the throttle 3 becomes the opening degree at the time of the steady HCCI operation so that the amount of fuel supplied to the intake passage 111*p* becomes the amount of fuel supplied at the time of the steady HCCI operation (that is, the valve becomes of a closed state). As described above, the amount of fuel supplied increases only during the switching period in which the air-fuel mixture becomes excessively lean, and therefore, the combustion mode is smoothly switched from the SI combustion to the HCCI combustion while the air-fuel mixture is efficiently prevented from becoming temporarily lean.

The invention is not to be limited to the details given herein, but may be modified within the scope and equivalence of the appended claims.

The invention claimed is:

1. A homogeneous charge compression ignition engine having a combustion chamber and an intake passage which is connected to the combustion chamber, wherein the engine allows the combustion mode to be switched between spark ignition combustion and homogeneous charge compression ignition combustion through a switching period, the engine provides a negative overlap period in an operation during homogeneous charge compression ignition combustion, the negative overlap period being a period during which an intake valve and an exhaust valve are both closed when a piston is in the vicinity of the top dead center in the exhaust stroke, so that burned gas remains inside the combustion chamber, and the engine comprises:

a throttle for adjusting the amount of air supplied to the combustion chamber;

an adjusting section for adjusting the amount of fuel supplied to the intake passage at a point upstream from the throttle; and a control section for controlling the throttle and the adjusting section, wherein, during the switching period in which the spark ignition combustion is switched to the homogeneous charge compression ignition combustion, the control section controls the throttle such that the opening degree of the throttle increases to the opening degree at the time of the steady operation at the homogeneous charge compression ignition combustion from the opening degree at the time of steady operation at the spark ignition combustion, and controls the adjusting section such that the amount of fuel supplied to the intake passage becomes greater than the amount at the time of the steady operation at the spark ignition combustion.

2. The engine according to claim 1, further comprising a fuel supplying path which is connected to the intake passage, wherein the adjusting section is a fuel valve provided in the fuel supplying path, and wherein the control section increases the opening degree of the throttle step by step during the switching period.

3. The engine according to claim 2, wherein the control section increases the opening degree of the throttle in at least one step from the second step onward by an incremental amount which is greater than the incremental amount in the first step.

4. The engine according to claim 1, further comprising:

a mixer which is placed in the intake passage and mixes air that has been taken in with the fuel;

a first fuel supplying path for supplying the fuel to the mixer; and a second fuel supplying path which branches out from the first fuel supplying path and is connected to the intake passages, wherein the fuel is a gas fuel, and wherein the adjusting section is an on-off valve provided in the second fuel supplying path.

5. The engine according to claim 1, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

6. The engine according to claim 1, wherein the control section controls the adjusting section such that the amount of fuel supplied to the intake passage at the time of the steady operation at the homogeneous charge compression ignition combustion becomes less than the amount at the time of the steady operation at the spark ignition combustion.

7. The engine according to claim 2, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

8. The engine according to claim 3, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

9. The engine according to claim 4, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

10. The engine according to claim 2, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

11. The engine according to claim 3, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

12. The engine according to claim 4, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

13. The engine according to claim 5, wherein, during the switching period, the control section:

controls the adjusting section before the opening degree of the throttle becomes the opening degree at the time of steady operation at the homogeneous charge compression ignition combustion, such that the amount of fuel supplied to the intake passage becomes greater than at the time of the steady operation at the spark ignition combustion, and thereafter controls the adjusting section such that the amount of fuel supplied to the intake passage becomes the amount at the time of the steady operation at the homogeneous charge compression ignition combustion.

* * * * *